Figure 1:
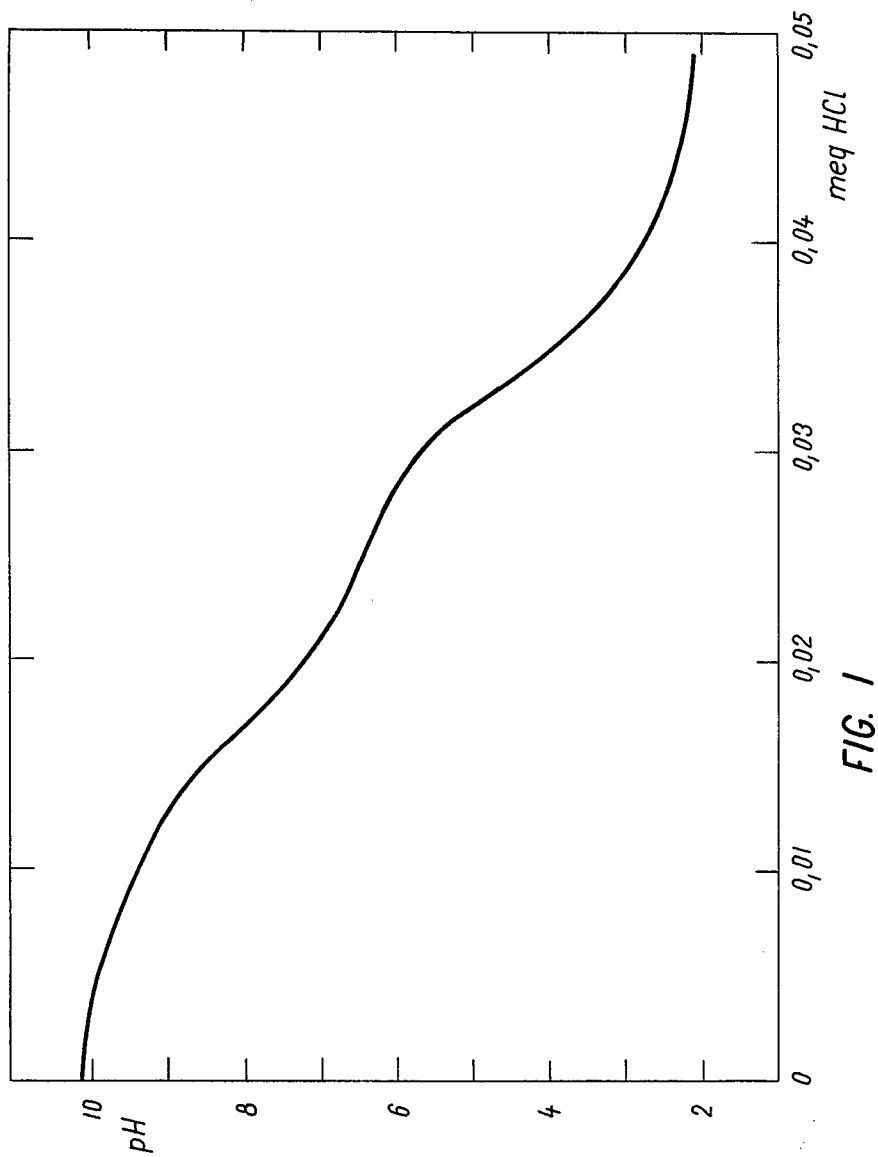

United States Patent [19]

Strop et al.

[11] 4,101,461

[45] Jul. 18, 1978

[54] METHOD FOR PREPARATION OF ANION EXCHANGERS BY SUBSTITUTION OF HYDROPHILIC POLYMERIC GELS

[75] Inventors: Petr Strop; Jiri Coupek; Otakar Mikes; Jiri Hradil, all of Prague, Czechoslovakia

[73] Assignee: Czechoslovenska akademie ved, Prague, Czechoslovakia

[21] Appl. No.: 548,094

[22] Filed: Feb. 7, 1975

[30] Foreign Application Priority Data

Feb. 8, 1974 [CS] Czechoslovakia ............ 896-74

[51] Int. Cl.² .................. B01D 15/04; C08J 5/20; B01D 15/08
[52] U.S. Cl. .................. 521/32; 526/16; 526/49; 526/52.1; 526/52.3; 526/52.5; 526/304; 526/307; 526/320; 526/328.5
[58] Field of Search .............. 260/2.1 C, 80.71, 80.75, 260/80.73, 29.6 TA, 2.1 E, 29.6 N, 29.6 E; 526/16, 55, 49

[56] References Cited

U.S. PATENT DOCUMENTS

| | | | |
|---|---|---|---|
| 3,175,997 | 3/1965 | Hsieh | 526/55 |
| 3,220,960 | 11/1965 | Wichterle | 260/29.6 E |
| 3,277,025 | 10/1966 | Glodin et al. | 260/2.1 |
| 3,629,230 | 12/1971 | Soderquist | 260/2.1 R |

OTHER PUBLICATIONS

Polymer Preprinter — vol. 16, No. 2, Aug. 1975, pp. 272-275.

*Primary Examiner*—Joseph L. Schofer
*Assistant Examiner*—Peter F. Kulkosky

[57] ABSTRACT

The invention relates to a method for preparation of hydrophilic anion exchangers from gels based on crosslinked copolymers of hydroxyalkyl acrylates and methacrylates, oligo- and polyglycol monoacrylates and monomethacrylates, hydroxyalkylacrylamides or hydroxyalkylmethacrylamides with crosslinking comonomers containing 2 or more acrylcyl or methacryloyl groups in the molecule, as alkylene, oligo- and polyglycol diacrylates and dimethacrylates or divinylbenzene, which gels may have the homogeneous, heterogeneous or macroporous character. The hydroxyl groups of the initial hydrophilic gel are modified by the reaction with halogenoalkylamines, halogenoalkylammonium compounds, epoxyalkylamines and epoxyalkylammonium compounds or with compounds having several reactive groups in the molecule, as epichlorohydrine, di- and polyepoxides, di- and polyisocyanates, halogenoalkylepoxides, epoxyalkylamines and phosgene, and the subsequent reaction with compounds rendering anion-exchanging groups, as hydroxyalkylamines, diamines and their ammonium compounds. The later procedure may be carried out in one step. The hydroxyl groups of the initial gel can be also substituted by halogens and transformed into quaternary ammonium compounds by reaction with amines. All reactions may be performed also with gels combining alkoxide instead of hydroxyl groups.

17 Claims, 2 Drawing Figures

METHOD FOR PREPARATION OF ANION EXCHANGERS BY SUBSTITUTION OF HYDROPHILIC POLYMERIC GELS

The invention relates to a method for performation of chemical reactions to convert non-ionogenous polymeric hydrophilic gels of the hydroxyacrylate or hydroxymethacrylate type into anion exchangers of various strength by substitution of a part of hydroxyl groups present in the initial polymer by cationic groups.

Semimacroporous and macroporous acrylate and methacrylate matrices proved useful as a very suitable carrier of the anionic functional groups in preparation of cation exchangers (Czechoslovak patent application No. PV 704-74, corresponding to U.S. Pat. No. 3,991,018). The obtained cation exchangers retained suitable properties of the initial gels, i.e. considerable hydrophility combined with a high chemical stability and an extraordinary mechanical strength of particles. Elution of columns packed with these materials is not limited by deformation or disintegration of the particles at high pressures and high flow rates. These materials turned out being perspective for sorption of biopolymers and in the developing liquid chromatography.

The methods which were worked out for the anionic substitution of a part of hydroxyl groups in hydroxacrylate and hydroxymethacrylate gels and confirmation of their properties showed also the way for the cationic substitution. The above mentioned advantageous properties of aero-xerogel matrices are retained also in the cationic substitution and the resulting gels represent new valuable materials applicable above all in separation of sensitive biological materials.

Synthetic styrene-divinylbenzene anion exchangers or anion exchangers with another synthetic matrix may be prepared by numerous reactions which, however, are generally unsuitable for substitution of the highly hydrophilic gels rich wit hydroxyl groups. A fundamental and most often used reaction is, at non-ionogenous hydrophilic gels, the reaction of hydroxyl groups with halogenoalkylaminoalkyl derivatives, for example with $Cl—CH_2CH_2N(CH_2CH_3)_2$. The resulting product can be quaternized by a subsequent substitution at the nitrogen atom. The reaction may be carried out in water in the presence of NaOH or in the alcoholic reaction medium. The final character of the formed anion exchanger is often characterized as weakly or medium basic. Several products, including polyaddition products, are formed in the reaction of cellulose with epichlorohydrine in the presence of triethanoamine and under catalysis of hydroxide by a not completely alucidated reaction mechanism. The reaction products are used in chromatography.

An objective of this invention is a method for preparation of hydrophilic anion exchangers from polymeric gels, which contain hydroxyl groups in their structure, consisting in modification of crosslinked copolymers of acrylate, methacrylate, acrylamide and methacrylamide monomers which contain hydroxyls by the reaction of the hydroxyl group forming a functional group which renders cation by dissociation. The polymeric gels are prepared by a suspension copolymerization of monomers selected from a group, which comprises hydroxyalkyl methacrylates, hydroalkyl acrylates, oligo- and polyglycol methacrylates, oligo- and polyglycol acrylates, hydroxyalkylacrylamides and hydroxyalkylmethacrylamides, with crosslinking monomers containing two or more acryloyl and methacryloyl groups in the molecule and selected from the group which comprises di- and polyacrylates and methacrylates, glycol acrylates, glycol methacrylates and divinylbenzene.

Hydroxyl groups can be advantageously modified by reaction with halogenoalkylamines, halogenoalkylammonium compounds, epoxyalkylamines and epoxyalkylammonium compounds. The compounds having several groups reacting with hydroxyls in the molecule are used for the modification of hydroxyl groups of the gel and the remaining reactive groups of these compounds are employed in the following reaction to bind molecules which contain anion exchanging functional groups. The compounds having several reactive groups are advantageously epichlorohydrine, diepoxides, polyepoxides, di- and polyisocyanates, halogenoalkylepoxides, epoxyalkylamines and phosgene.

The above mentioned reaction may be carried out in a single reaction step. Hydroxyls of the copolymer may be substituted by halogen or alkoxide reactive groups and the gels modified in this way can be used for other modifications giving rise to ionogenous groups.

The reactions described in examples can be carried out even under relatively drastic conditions as the hydrolytically and thermally high-resistant matrix of the gel allows this without its destruction. This enables to choose reaction conditions leading to high conversions during the substitution reaction and to high exchange capacities, if it is required. In comparison to hydrophilic gels of the polysaccharide type, the anion exchangers prepared according to this invention have substantially better mechanical properties, an insignificant abrasion at handling and suitable sorption properties and may be prepared with an arbitrary porosity. The gels were prepared in various forms - as spheroids, blocks, granules, fibers, membranes, fabrics, etc. Thanks to the rigidity of their macroporous structure, the anion exchangers swell only very slightly in water an in organic solvents and do not change their shape with the changing ionic strength of a solution. These properties predestinate them for applications in batch as well as column operations in a laboratory and production scale. Anion-exchanging gels were developed especially for the purpose of sorption and chromatography. of biopolymers, but this does not limit further possibilities of their application by any means.

EXAMPLE 1

A copolymer of 2-hydroxyethyl methacrylate with ethylene dimethacrylate (5 g), having the molecular weight exclusion limit 100,000, was swollen in 50 ml of 30% NaOH solution previously cooled to 5°–10° C. The suspension was stirred and 20 g 2-chloroethyl-N,N-diethylamine hydrochloride was added. The mixture was thoroughly stirred, heated to 110° C and kept at this temperature under stirring for 30 minutes. On cooling, the gels was filtered off, washed with methanol, water, 20% HCl, water, 20% NaOH, water, 10% HCl, water, methanol and acetone and dried first in air and then in vacuum. Found by the elemental analysis: Cl 2.13% and N 1.38%; the exchange capacity was about 0.6 mquiv/g.

EXAMPLE 2

A copolymer of diethylene glycol monomethacrylate with ethylene dimethacrylate (5 g), having the molecular weight exclusion limit 150,000, was swollen in a mixture of 20 ml of distilled water and 30 ml of N,N- dimethylformamide. Into the suspension, 10 ml of 40% NaOH solution was added and the mixture was thoroughly stirrer. The excessive liquid was removed by suction and 20 ml of epichlorohydrine was added to the gel. The mixture was stirred and heated to 60° C for about 1 hour. The temperature was then increased to 105° C and 50% NaOH solution was dropwise added into the mixture in 10 ml portions within one hour intervals. The mixture was thoroughly stirred after addition of each portion and was heated for 7 hr on the whole. The gel was then filtered off, washed with methanol, water, concentrated HCl, water, methanol and acetone and dried in air and then in vacuum. It was determined 1.63% Cl by the elemental analysis. The gel modified in this way (2 g) was heated for 20 min with 20 ml of 40% NaOH to 60° C and then 10 g of triethanolamine was added into the mixture. The mixture was thoroughly stirred and heated under pressure to 140° C for 10 hr. On cooling, the product was filtered off, washed with ethylene glycol, water, methanol, 10% HCl, water, 10% NaOH, water, methanol, acetone and ether. The product contained 0.5% N as determined by the Kjehldal method.

EXAMPLE 3

The gel modified by epichlorohydrine according to Example 2 (2 g) was heated with 20% HCl to 60° C for 1 hr. The mixture was vigorously stirred during heating. The gel was then filtered off, washed with hot water, methanol, acetone and ether. Then it was freed of ether in part in air, washed with N,N-dimethylformamide and 20 ml of N,N-dimethylformamide with 20 ml of trimethanolamine was added. The mixture was homogenized and heated to 120° C for 18 hr with occasional stirring. The modified gel was filtered off, washed with methanol, acetone, water, 10% HCl, water, methanol, acetone and ether. The product was analyzed on the nitrogen content by the Kjehldal method.

EXAMPLE 4

A copolymer of 2-hydroxyethyl methacrylate with ethylene dimethacrylate (5 g), having the molecular weight exclusion limit 300,000, was swollen in 30 ml of 40% NaOH solution which was precooled to −10° C. The mixture was allowed to stand for 30 min and then a solution of 15 ml of triethanolamine and 15 ml of epichlorohydrine was dropwise added in the beginning under cooling and later by such rate to maintain the temperature at 60° C. After completion of the reaction, the mixture was further heated to 60°–70° C for 30 min. The gel was then washed with hot methanol and water, extracted with pyridine and then again washed with water, 30% HCl, water, methanol, acetone and ether. The modified gel was dried first in air and then in vacuum. By the elemental analysis it was found 6.6% Cl and 2.3% N. The exchange capacity was 2 mequiv/g.

EXAMPLE 5

A mixture of 15 ml of epichlorohydrine and 15 ml of triethanolamine was boiled under a reflux condenser for 7 hr. An oily product which separated during the reaction was gradually withdrawn from the reaction mixture. A complete conversion of the reaction components into the product was observed after 7 hours. Heating was stopped and the sirupy material was extracted by shaking with ether and acetone. The product was then dissolved in N,N-dimethylformamide and again shaken with ether and acetone. N,N-Dimethylformamide was evaporated in a vacuum rotary evaporator. The product crystallized from the N,N-dimethylformamide residues on standing. A direct titrimetric determination gave 14.6% Cl in the product while the elemental analysis gave 16.5% Cl. The product - 2,3-epoxypropyl-N,N-triethylammonium chloride — was added in the amount of 2 g to 1 g of a copolymer of 2-hydroxyethyl methacrylate with ethylene dimethacrylate having the molecular weight exclusion limit 300,000. The mixture was heated to about 90° C, thoroughly stirred and then the 30% NaOH solution was dropwise added under vigorous stirring. The heating was continued so that the temperature 90° C was kept during addition of whole 10 ml of NaOH solution. After completion of the reaction, the mixture was further heated to this temperature for 4 hours. On cooling, the product was filtered off, extracted with hot methanol and water, washed with 10% HCl, water, 10% NaOH, water, methanol, acetone and ether and dried first in air and then in vacuum. The amount of incorporated nitrogen determined by the Kjehldal method was 0.62% N.

EXAMPLE 6

The modified gel according to Example 1 (2 g) was swollen in 10 ml of N,N-dimethylformamide (acetone or ethanol) and 10 ml of butyl bromide (ethyl bromide, iodide or chloride) was added. The mixture was homogenized and then heated under pressure to the temperature chosen according to the used compounds (to 150° C for N,N-dimethylforamide - butyl bromide, to 90° C for ethanol - ethyl bromide, to 85° C for acetone - ethyl bromide) for 10 hours. The gel was then filtered off, washed with methanol, water, 10% HCl, water, 30% NaOH and water and its basicity was proved by phenolphthalein (the non-quarternized derivatives in the base cycle do not transfer phenolphthalein into the basic form). The product was washed with water, methanol, dioxan, acetone and ether and dried first in air and then in vacuum.

EXAMPLE 7

A copolymer of 2-hydroxyethyl acrylate with methalenebisacrylamide (2 g), having the molecular weight exclusion limit 100,000, was swollen in 30 ml of pyridine and 10 ml of thionyl chloride was dropwise added to this suspension. During addition, the mixture was vigorously stirred and cooled so that the temperature did not exceed 20° C. The mixture was stirred for further 10 min after completion of the reaction and then it was poured into a large excess of cold water. The product was stirred in water for 5 min, then filtered off, washed with distilled water, concentrated hydrochloric acid, water, 20% NaOH, water, alcoholic hydroxide, methanol, water 20% HCl, water, methanol and acetone and dried first in air and then in vacuum. The product was analyzed on the content of Cl by the elemental analysis and 3.8% Cl was found.

EXAMPLE 8

A flask was charged with 2 g of a copolymer of 2-hydroxyethyl methacrylate with diethylene glycol dimethacrylate, having the molecular weight exclusion limit 200,000, 5 g of potassium iodide and 2 ml of butanol-1. The mixture was homogenized and then 10 ml of 85% phosphoric acid was added. The mixture was very vigorously stirred and heated in an oil bath under a reflux condenser for 5 hours. The gel was then filtered off, washed with hot water, methanol, concentrated HCl, water, 5% NaOH, water, methanol, acetone and ether and then dried first in air and then in vacuum. The elemental analysis found 9.2% J in the gel.

EXAMPLE 9

The modified product according to Example 8 (1 g) was swollen in a mixture of 3 ml of trimethanolamine and 3 ml of N,N-dimethylformamide. The mixture was heated to 150° C with occasional stirring for 28 hours. The product was cooled, filtered off, extracted with alcohol, washed with water, methanol, 10% HCl solution, water, 10% NaOH solution, water, 10% HCl, water, methanol, acetone and ether. The extent of transformation was determined by analysis of the halogen content in the halogenated gel and in the ion-exchanger transfered into an OH cycle.

EXAMPLE 10

A copolymer of 2-hydroxyethyl methacrylate with ethylene dimethacrylate (1 g), having the molecular weight exclusion limit 300,000, was dispersed in small portions in 15 ml of a 10% solution of phosgene in benzene at the temperature 10° C. The reaction mixture was allowed to stand at the room temperature for 12 hours. The gel was then filtered off, washed several times with dry benzene and dried in an inert atmosphere of nitrogen. The analysis on chlorine showed that the extent of transformation was 80% of all hydroxyl groups present in the gel.

EXAMPLE 11

The same copolymer as in Example 10 (1 g) was packed into a glass column equipped with a thermocouple which was inserted into the gel bed. A mixture of 10 vol. % of phosgene and 90 vol. % of nitrogen was forced through the column by such rate that the temperature of the gel measured by the thermocouple did not exceed 35° C. The flow of phosgene was stopped after 15 minutes and the gel was eluted with the flow of dry nitrogen for further 15 minutes. The dry gel was analyzed on Cl and 83.7% of all hydroxyl groups present in the initial gel was found being transformed into —OCOCl groups.

EXAMPLE 12

A copolymer of 2-hydroxyethyl methacrylate with ethylene dimethacrylate (0.8 g), having the molecular weight exclusion limit 100,000, was swollen in 2 N NaOH at 25° C for 10 min. The excessive hydroxide was removed by suction (residue 1.8 g), 1.4 ml of 2-chloroethyl-N,N-diethylamine was added and the mixture was thoroughly homogenized and sealed in an ampoule. The mixture was allowed to stand in the ampoule for 3 hr at the laboratory temperature with occasional stirring and then was heated to 85° C for 1 hr. After cooling, the gel was washed with water, methanol, 2 N HCl, water, methanol, acetone and ether and dried in vacuum. Determination according Kjehldal showed 2.19% N; the total exchange capacity was 1.6 mequiv/g.

EXAMPLE 13

A mixture of 10 ml of-2-chloroethyl-N,N-diethylamine and 10 ml of N,N-dimethylformamide was shortly heated to 100° C under stirring and then was allowed to stand for ½ hr. The resulting crystals were filtered and washed with N,N-dimethylformamide and acetone. A copolymer of 2-hydroxyethyl methacrylate with ethylene dimethacrylate (2 g), having the molecular weight exclusion limit 100,000, was mixed with 2 g of the above crystals and 5 ml of 2 N NaOH. The mixture was heated to 65° C for 1 hr. The gel was then washed with water, acetone and N,N-dimethylformamide, water, 2 N HCl, water, methanol, acetone and ether and dried in vacuum. According to Kjehldal, 0.75% N and determined.

EXAMPLE 14

A copolymer of 2-hydroxyethyl methacrylate with ethylene dimethacrylate (1 g), having the molecular weight exclusion limit 100,000, was swollen in the excess of 2-chloroethyl-N,N-diethylamine for 1 hr. Then, the excessive amine was removed by suction (the residual total weight 3 g) and 0.75 ml of 2 N NaOH was added. The mixture was homogenized, sealed in an ampoule, allowed to stand for 2 hr at the laboratory temperature with occasional stirring and then heated to 85° C for 1 hr. After cooling, the gel was washed with water, methanol, N,N-dimethylformamide, water, 2 N HCl, water, methanol, acetone and ether and dried in vacuum. Determination according to Kjehldal showed 0.81% N.

EXAMPLE 15

A dried copolymer of 2-hydroxyethyl methacrylate with ethylene dimethacrylate (5 g), having the molecular weight exclusion limit 100,000, was mixed with the reaction product obtained from 6 g Mg and 25 ml of ethyl bromide in 35 ml of dry ether. The gel was decanted with ether and 1 g of it was mixed with 2 ml of butanediepoxide (dried over molecular sieves). The mixture was allowed to stand for 30 min nd then heated in a sealed ampoule to 45° C for 4 hr. The gel was then washed with acetone, 0.5 N HCl, methanol and acetone and allowed to stand with 2 N HCl for 4 hr. Then it was was washed with water, methanol, acetone and ether and dried. The gel contained 1.77% Cl according to the elemental analysis.

EXAMPLE 16

A conic flask was charged with 5 g of a phosgenated gel prepared according to the Czechoslovak Patent Application PV 6008-73 (corresponding to U.S. Pat. No. 4,031,037, issued June 21, 1977) from a copolymer of 2-hydroxyethyl methacrylate with ethylene dimethacrylate, having the molecular weight exclusion limit 100,000 and the particle size 100–200 μ. Triethanolamine (10 ml) was added under vigorous stirring and the mixture was allowed to stand overnight. The gel was washed with methanol, water, acetone, ether, methanol, water, 0.5 N HCl, ethanol, acetone and ether and dried. The determination by the elemental analysis and the Kjehldal method showed 3.84% Cl and 2.02% N, respectively.

EXAMPLE 17

A copolymer of triethylene glycol monomethacrylate with 1,10decamethylene glycol dimethacrylate (2 g) was swollen in 6 ml of distilled water and 4 g of NaOH was stepwise added. The mixture was cooled and stirred. The excessive solution was removed by suction and 2 g of N-(2-bromomethyl)-N,N,N-trimethylammonium bromide in 3 ml of distilled water was added. The mixture was heated to 80° C for 30 min. The gel was then washed with water, 2 N HCl, water, 2 N NaOH, water, 2 N HCl, 99% ethanol and acetone. The Kjehldal analysis showed 0.5% N.

EXAMPLE 18

A polymer of the following type (0.12 g):

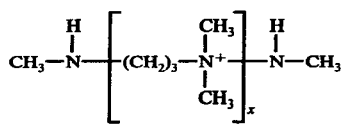

with the intrinsic viscosity in 0.2 M KBr solution equal 0.1, was dissolved in 0.25 ml of distilled water and added to 0.12 g of a phosgene treated gel, which was prepared by the reaction with 10% benzene solution of phosgene and the subsequent washing with benzene and drying. The mixture was allowed to stand for 10 minutes at the laboratory temperature and then heated to 70° C for 10 min. A mixture pyridine - water 1:1 was added in the amount of 15 ml and the heating was continued for further 1 hour. The gel was washed with water, ethanol, acetone, ether, acetone and water, allowed to stand with 2 N NCl for 20 minutes and then washed with 99% ethanol, acetone and ether. The gel was dried and analyzed on nitrogen; 0.8% N was found. FIG. 1 shows a titration curve of the resulting ion exchanger. The consumption of HCl is plotted on the axis of abcissa and the corresponding pH values on the axis of ordinate.

EXAMPLE 19

A flask was charged with 7 g of gel, which was transfered into L1 alkoxide by the reaction with a moderate excess of a tetrahydrofuran solution of butyllithium under stirring and cooling for 30 min in the atmosphere of nitrogen and the subsequent washing with dry tetrahydrofuran. Butanediepoxide (dried by the molecular sieve Potasit A3) was added to the gel in the amount of 27 g. The flask was heated to 70° C and maintained at this temperature for 3 hours under occasional stirring and without excess of moisture. The mixture was then allowed to stand overnight and heated under a reflux condenser to 100° C for 10 min. The temperature inside the flask reached 130° C and the mixture was kept at this temperature for 5 min. The gel was then cooled, washed with acetone, ether, acetone, rapidly with cold water and a large excess of acetone, ether, chloroform and other and dried in vacuum. The gel modified in this way with butanediepoxide (0.3 g) was mixed with 0.25 g of isonicotinic acid in 1 ml of water, homogenized, allowed to stand for 1 hr at the laboratory temperature, then heated to 95° C for 4 hours and allowed to stand at the laboratory temperature for 2 days. The gel was then washed with water, ethanol, acetone and ether. The Kjehldal method showed 1.7% N.

EXAMPLE 20

A copolymer of 2-hydroxyethyl methacrylate and ethylene dimethacrylate (0.3 g) which had the molecular weight exclusion limit 100,000 and was modified with butanediepoxide according to Example 19, was mixed with a solution of 0.62 g of hexamethylenediamine in 1 ml of water. The mixture was allowed to stand for 1 hour at the laboratory temperature and then heated to 95° C for 4 hours. After two days of standing, the gel was washed with water, methanol, ethanol, acetone and ether. The nitrogen determination according to Kjehldal gave 2.7% N.

EXAMPLE 21

The gel which was modified with butanediepoxide according to Example 19 (0.3 g) was mixed with a solution of 0.14 g of a polymer of the following type in 0.5 ml of water:

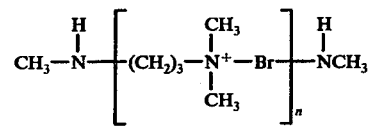

(the intrinsic viscosity 0.1 in 0.2M KBr solution). The mixture was mixed with 0.1 ml of phenol, allowed to stand at the laboratory temperature for 1 hr and then heated to 95° C for 4 hours. After two days of standing, the gel was washed with water, methanol, ethanol, acetone and ether and dried in vacuum. The elemental analysis and the Kjehldal method showed 0.52% Cl and 0.67% N, respectively.

EXAMPLE 22

An annealed test-tube was charged with about 0.7 ml of a gel (a copolymer of 2-hydroxyethyl methacrylate with ethylene dlmethacrylate, having the molecular weight exclusion limit 100,000) which was previously modified by the reaction with a moderate excess of the tetrahydrofuran solution of butyllithium under stirring and cooling in the nitrogen atmosphere for 30 min and washed with dried tetrahydrofuran. The equal volume of N-(2,3-epoxypropyl)-N,N,N-triethylammonium chloride and 0.5 ml of dried N,N-dimethylformamide were added to the gel. The mixture was thoroughly homogenized and kept in a bath thermostated to 38° C for 25 hours. The gel was then washed with N,N-dimethylformamide, acetone, ethanol, acetone and ether and dried in vacuum. In the sample, 1.7% Cl and 0.81% N was determined.

EXAMPLE 23

A copolymer of 2-hydroxypropyl acrylate with hexamethylenebisacrylamide (1 g), having the molecular weight exclusion limit 50,000, was weighed into an aspoula and 1.5 g of N-(2,3-epoxypropyl)-N,N,N-triethylammonium chloride and 1.8 ml of 2 N NaOH were added. The mixture was homogeniyzed by stirring and placed in a thermostated bath at 30° C for 24 hours. The gel was then filtered, washed with water, ethanol and water, allowed to stand with 2 N HCl for 5 minutes, further washed with ethanol, acetone and ether and dried in vacuum. The sample contained 0.25% Cl and 0.47% N.

EXAMPLE 24

A copolymer of 2-hydroxypropyl methacrylate with divinylbenzene (0.2 ml), having the molecular weight exclusion limit 200,000, was mixed with 1 ml of 9% solution of N-(2-bromoethyl)-N,N,N-trimethylammonium bromide in 0.5 M NaOH. The mixture was heated to 38° C for 2 hours. The gel was then filtered, washed with water, 2 N HCl, methanol, acetone and ether and dried in vacuum. The nitrogen determination according to Kjehldal showed 0.4% N.

EXAMPLE 25

Figure 2:
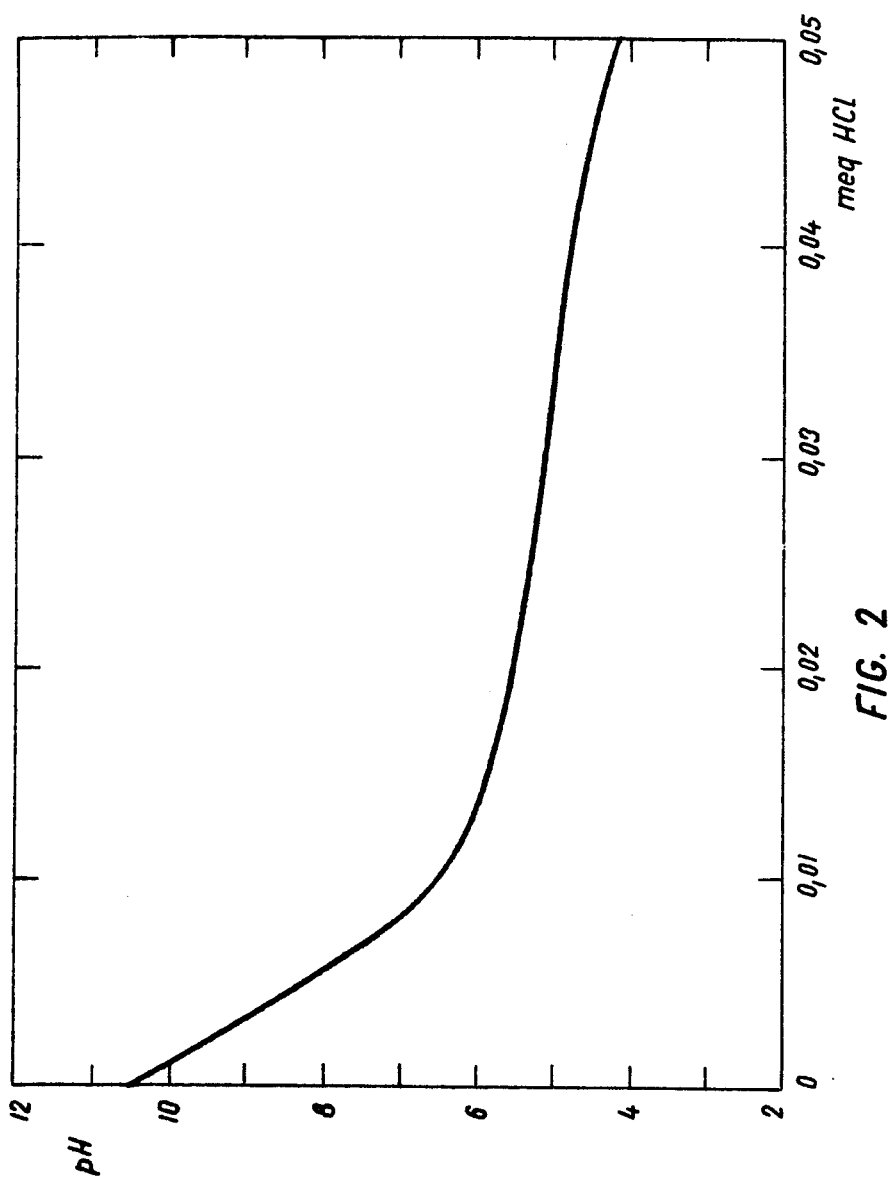

An ampoule was charged with 0.4 g of the gel modified by the procedure described in Example 15 and 2 ml of dimethylsulfoxide and 0.7 ml of trietanolamine were added. The mixture was allowed to stand for 3 days at the laboratory temperature and then heated to 90° C for 28 hours. The gel was washed with water, 30% KOH solution, water, methanol, acetone, toluene and water. In the dry gel 0.6% N was found. FIG. 2 shows the titration curve of the ion exchanger in the OH form; the consumption of 0.1 N HCl is plotted on the axis of abcissas and the corresponding pH values on the axis of ordinates.

We claim:

1. Method for the preparation of hydrophilic anion exchangers from polymeric gels containing hydroxyl groups in their structure wherein a crosslinked copolymer of hydroxyl group containing acrylate, methacrylate, acrylamide and methacrylamide monomers is modified by reaction of said copolymer with an amino compound selected from the group consisting of halogenoalkylamines, halogenoalkylamonium compounds, epoxyalkylamines and epoxyalkylammonium compounds, said reaction being effected after activation of said copolymer by treatment thereof under basic conditions.

2. Method as set forth in claim 1, wherein two polymeric gels are prepared by a suspension copolymerization of monomers selected from a group comprising hydroxyalkyl methacrylates, hydroxyalkyl acrylates, oligo- and polyglycol methacrylates, oligo- and polyglycol acrylates, hydroxyalkylacrylamides and hydroxyalkylmethacrylamides with crosslinking mononomers which contain two or more acryloyl or methacryloyl groups in the molecule and are selected from a group comprising di- and polyacrylates and methacrylates, glycol acrylates, glycol methacrylates or with divinylbenzane.

3. Method as set forth in claim 1, wherein the copolymers have the homogeneous, heterogeneous or macroperous structure.

4. The method of claim 1 in which the reaction of said copolymer with said amino compound is effected by holding the reactants at 30°–110° C. for periods ranging from 24 hours at 30° C. to 0.5 hour at 110° C.

5. The method of claim 4 in which said copolymer is initially swollen in said amino compound.

6. The method of claim 4 in which said copolymer is reacted directly with one of said ammonium compounds selected from the group of said amino compounds in the presence of aqueous caustic.

7. Hydrophilic anion exchangers formed in accordance with the method of claim 1.

8. Hydrophilic anion exchangers formed from polymeric gels containing hydroxyl groups in their structure by reacting a crosslinked copolymer of hydroxyl group containing acrylate, methacrylate, acrylamide and methacrylamide monomers with an amino compound selected from the group consisting of halogenoalkylamines, halogenoalkylammonium compounds, epoxyalkylamines and epoxyalkylammonium compounds, the reaction being effected after activation of said copolymer by treatment thereof under basic conditions.

9. Method for the preparation of hydrophilic anion exchangers from polymeric gels containing hydroxyl groups in their structure wherein a crosslinked copolymer of hydroxyl group containing acrylate, methacrylate, acrylamide and methacrylmide monomers is modified by reaction of said copolymer with a reactive group containing compound selected from the group consisting of epichlorohydrin, di- and polyepoxides, halogenoalkylepoxides, epoxyalkylamines and phosgene and the subsequent or simultaneous reaction with a nitrogen-containing compound selected from the group consisting of hydroxyalkylamines, diamines and their ammonium compounds, said copolymer being initially activated by treatment thereof under basic conditions.

10. The method of claim 9 in which the reaction of said copolymer is first effected with said reactive group containing compound by holding the reactants at 45°–130° C. for periods ranging from 3.25 to 7 hours.

11. The method of claim 10 in which the product thereof is subsequently reacted with said nitrogen-containing compound by holding the reactants at 90°–140° C. for periods ranging from 4 to 28 hours.

12. The method of claim 9 in which the reaction of said copolymer is effected simultaneously with said reactive group containing compound and said nitrogen-containing compound by holding the reactants at 60°–90° C.

13. The method of claim 4 in which said copolymer is initially swollen in aqueous caustic.

14. The method of claim 10 in which said copolymer is initially swollen in a mixture of water and N,N-dimethylformamide.

15. The method of claim 12 in which said copolymer is initially swollen in aqueous caustic.

16. Hydrophilic anion exchangers formed from polymeric gels containing hydroxyl groups in their structure by reacting a crosslinked copolymer of hydroxyl group containing acrylate, methacrylate, acrylamide and methacrylamide monomers with a reactive group containing compound selected from the group consisting of epichlorohydrin, di- and polyepoxides, halogenoalkylepoxides, epoxyalkylamines and phosgene and the subsequent or simultaneous reaction with a nitrogen-containing compound selected from the group consisting of hydroxyalkylamines, diamines and their ammonium compounds, said copolymer being initially activated by treatment thereof under basic conditions.

17. Hydrophilic anion exchangers formed in accordance with the method of claim 9.

* * * * *